United States Patent
Tamura

(10) Patent No.: US 10,476,733 B2
(45) Date of Patent: Nov. 12, 2019

(54) SINGLE SIGN-ON SYSTEM AND SINGLE SIGN-ON METHOD

(71) Applicant: Hitachi Systems, Ltd., Tokyo (JP)

(72) Inventor: Mineyuki Tamura, Tokyo (JP)

(73) Assignee: HITACHI SYSTEMS, LTD., Tokyo (JP)

( * ) Notice: Subject to any disclaimer, the term of this patent is extended or adjusted under 35 U.S.C. 154(b) by 8 days.

(21) Appl. No.: 15/563,618

(22) PCT Filed: Apr. 15, 2015

(86) PCT No.: PCT/JP2015/061628
§ 371 (c)(1),
(2) Date: Oct. 2, 2017

(87) PCT Pub. No.: WO2016/166856
PCT Pub. Date: Oct. 20, 2016

(65) Prior Publication Data
US 2018/0091355 A1    Mar. 29, 2018

(51) Int. Cl.
*H04L 9/00*    (2006.01)
*H04L 29/06*    (2006.01)
(Continued)

(52) U.S. Cl.
CPC ...... *H04L 29/06768* (2013.01); *G06F 16/955* (2019.01); *G06F 16/9574* (2019.01);
(Continued)

(58) Field of Classification Search
CPC .................................................... G06F 21/41
See application file for complete search history.

(56) References Cited

U.S. PATENT DOCUMENTS

2007/0240206 A1    10/2007    Wu et al.
2012/0291141 A1*    11/2012    Doleh ............... G06F 21/335
726/28
(Continued)

FOREIGN PATENT DOCUMENTS

JP    2004-86510 A    3/2004
JP    2013-152757 A    8/2013
(Continued)

*Primary Examiner* — Josnel Jeudy
(74) *Attorney, Agent, or Firm* — Soroker Agmon Nordman

(57) ABSTRACT

Even if a user ID of a target user is not stored in a cooperation destination Web site, it is possible to access the cooperation destination Web site by use of a user ID of a cooperation source Web site. According to a typical embodiment, a cooperation source application calls up a log-in API of a cooperation destination Web server, based on information including the user ID. The log-in API records the information including the user ID as redirect information, creates a redirect token, and adds the redirect token to a URL of a guide application to send the URL. Based on the sent URL, the cooperation source application redirects access to the guide application. When the redirect information identified by the redirect token included in the URL is recorded, the guide application creates a log-in cookie based on the user ID included in the redirect information, and redirects the access to a cooperation destination application.

6 Claims, 2 Drawing Sheets

Figure 1:
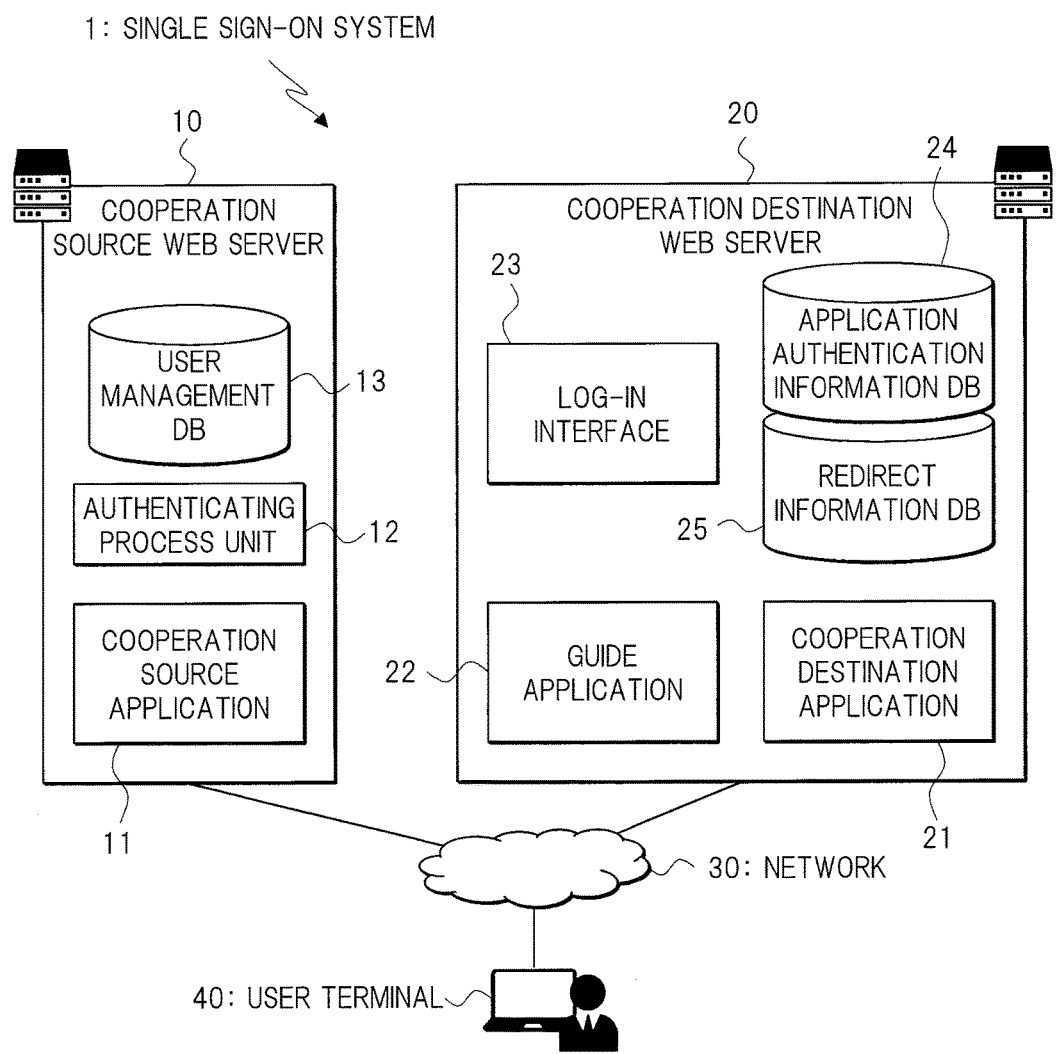

(51) Int. Cl.
*G06F 16/955* (2019.01)
*G06F 16/957* (2019.01)
*G06F 21/41* (2013.01)
*H04L 9/32* (2006.01)
*H04L 29/08* (2006.01)

(52) U.S. Cl.
CPC ............ *G06F 21/41* (2013.01); *H04L 9/3213* (2013.01); *H04L 67/2814* (2013.01)

(56) References Cited

U.S. PATENT DOCUMENTS

2013/0103802 A1    4/2013  Kawato
2014/0282940 A1*  9/2014  Williams ............ H04L 63/0815
                                                        726/6

FOREIGN PATENT DOCUMENTS

JP        2013-250894 A    12/2013
WO      2012/004916 A1    1/2012

\* cited by examiner

SINGLE SIGN-ON SYSTEM AND SINGLE SIGN-ON METHOD

TECHNICAL FIELD

The present invention relates to a technique applied effectively to a single sign-on system and a single sign-on method that achieves single sign-on in cooperation among a plurality of Web sites.

BACKGROUND ART

In recent years, a plurality of Web sites, systems, and services cooperate to one another to provide a service and allow seamless access to such sites, systems, and services. In accessing such sites, a system called single sign-on (which may be referred to also as "single sign-in," "single log-on," or "single log-in" and will hereinafter be collectively referred to as "SSO" (Signal Sign-On) in some cases) may be used such that authentication can be performed by use of a single user ID in access to each Web site and the like.

Various techniques relating to the SSO have been proposed. For example, Japanese Patent Application Laid-Open Publication No. 2013-152757 (Patent Document 1) describes a technique by which user IDs in a plurality of systems are associated with one another by use of user ID mapping between the systems to achieve the SSO between the systems. According to this technique, a first, system acquires user ID information on the first system, and according to an intersystem user ID mapping table, acquires ID information on a second system from the user ID information, and then, transmits the acquired ID information to the second system. Upon succeeding in authentication of a user, the second system automatically permits the user to log on.

RELATED ART DOCUMENT

Patent Document

Patent Document 1: Japanese Patent Application Laid-Open Publication No. 2013-152757

SUMMARY OF THE INVENTION

Problems to be Solved by the Invention

Conventional techniques including the technique described in Patent Document 1 etc. provide a system by which user IDs stored and managed in Web sites cooperating to one another are mapped to be associated with one another and from a user ID in one Web site, a user ID in the other Web site cooperating to the one Web site is extracted to allow a user to automatically log in to the other Web site using the extracted user ID.

However, according to such a system, for example, every time a Web site seeking cooperation to another Website arises, user ID mapping is required between both Web sites, and this is extremely troublesome. In addition, after the mapping is over, mapping information requires maintenance every time addition or change on a user ID is done. This leads to decrease maintainability. Also, when a user has no user ID stored in a cooperation destination Web site in the first place, the user cannot log in to the Web site, and this indicates that the system lacks flexibility.

An object of the present invention is to provide a single sign-on system and a single sign-on method enabling a user to access a cooperation destination Web site by use of a user ID of a cooperation source Web site, even if the user ID of the target user is not stored and managed in the cooperation destination Web site.

Above and other objects and novel features of the present invention will be apparent from the description of the present specification and the accompanying drawings.

Means for Solving the Problems

The typical ones of the inventions disclosed in the present application will be briefly described as follows.

A single sign-on system according to a typical embodiment of the present invention includes: a first Web server including a first application; and a second Web server including a second application. In response to a request for accessing the second application from a user having logged in to the first application through a Web browser of an information processing terminal, the system allows the user to log in to the second application by use of a user ID by which the user has logged in to the first application. The system includes the following features:

That is, the second Web server further includes: a log-in interface logging in to the second application through single sign-on; and a third application receiving access through the Web browser, the access being redirected by the first application to the third application.

Also, when receiving the request for accessing the second application from the user, the first application calls up the log-in interface of the second Web server, based on information on the user including the user ID. When called up by the first application, the log-in interface records the information on the user including the user ID, as redirect, information, creates a redirect token for identifying the redirect information, and adds the redirect token to a URL for accessing the third application and sends the URL.

Also, based on the URL sent in response to the call-up of the log-in interface, the first application redirects the access through the Web browser to the third application, and in response to the redirected access through the Web browser, when the redirect information identified by the redirect token included in the URL is recorded in the second Web server, the third application creates a log-in cookie related to the second application, based on the user ID included in the redirect information, and redirects the access through the Web browser to the second application.

Effects of the Invention

Effects obtained by the typical ones of the inventions disclosed in the present application will be briefly described as follows.

Specifically, according to a typical embedment of the present invention, even if a user ID of a target user is not stored and managed in a cooperation destination Web site, by use of a user ID of a cooperation source Web site, the user can access the cooperation destination Web site in a state in which security is ensured.

BRIEF DESCRIPTIONS OF THE DRAWINGS

Figure 2:
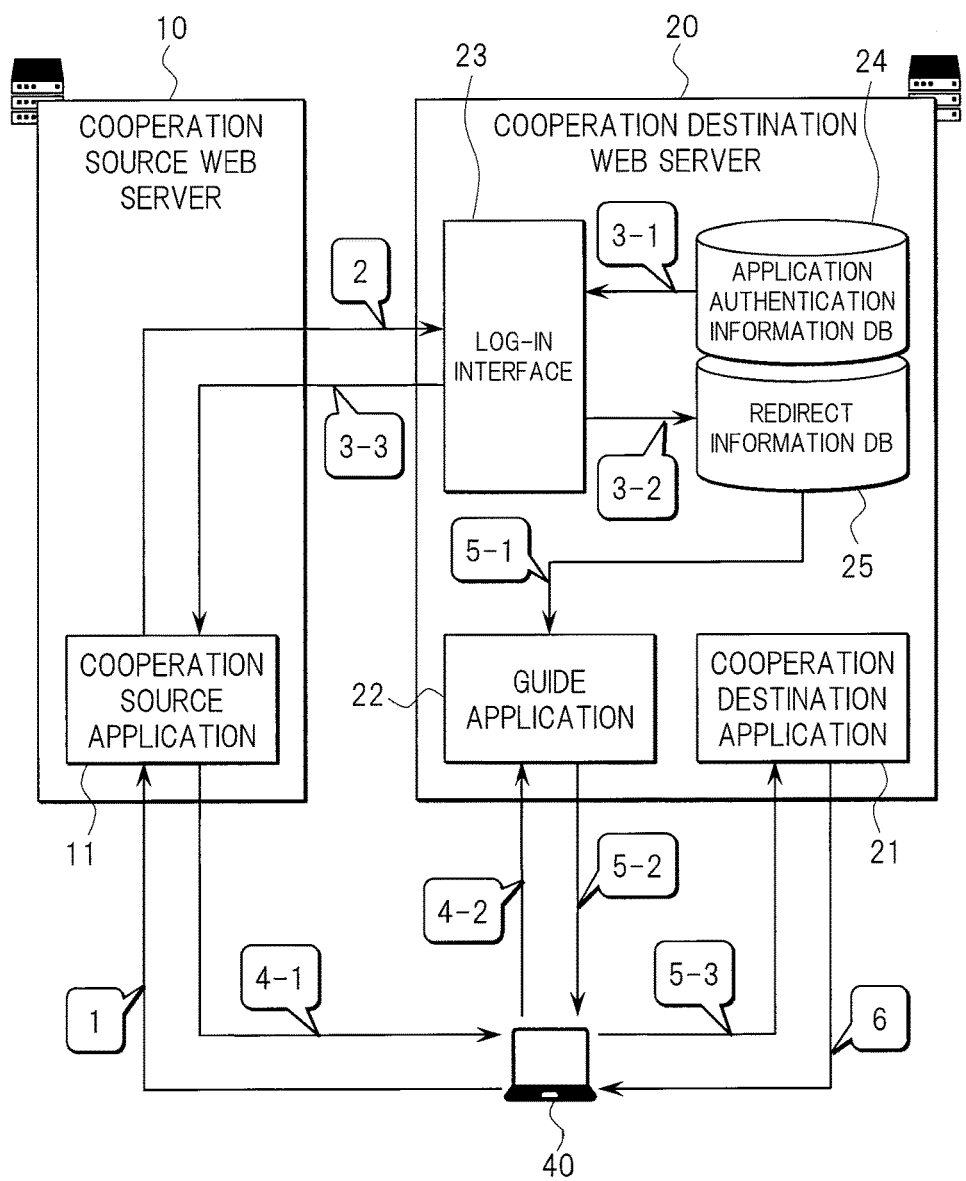

FIG. 1 is a schematic diagram of a configuration example of a single sign-on system according to an embodiment of the present invention; and FIG. 2 is a schematic diagram of an example of a flow of an SSO process according to the embodiment of the present invention.

DETAILED DESCRIPTION OF PREFERRED EMBODIMENT

Hereinafter, an embodiment of the present invention will be described in detail with reference to the drawings. Mote that components having the same function are denoted by the same reference characters throughout the drawings for describing the embodiment, and the repetitive description thereof is omitted.

<System Configuration>

FIG. 1 is a schematic diagram of a configuration example of a single sign-on system according to an embodiment of the present invention. For example, a single sign-on system 1 has a configuration in which a cooperation source Web server 10 and a cooperation destination Web server 20 are connected to a network 30 such as the Internet, and a user terminal 40 serving as an information processing terminal used by the user is connected to these servers via the network 30. The user accesses Web sites provided by the cooperation source Web server 10 and the cooperation destination Web server 20 through a Web browser (not illustrated) on the user terminal 40.

Each of the cooperation source Web server 10 and the cooperation destination Web server 20 is constituted by a virtual server built on a server device and a cloud computing service system and makes up a Web site using an OS (Operating System), a DBMS (DataBase Management System), middleware such as a Web server program, and software and applications operating on the middleware, which are not illustrated.

The cooperation source Web server 10 is a server system constituting a Web site (cooperation source Web site) originally used by the user, and a cooperation source application 11 serving as a Web application by which a service provided by the cooperation source Web site is realized is operating on the cooperation source Web server 10. Also, the cooperation source Web server 10 includes an authenticating process unit 12 and a user management database (DB) 13 carrying out a user authenticating process for allowing the user to access the cooperation source Web site and use its service. An authenticating function exerted by the authenticating process unit 12 and the user management DB 13 may be partly or entirely implemented by an authentication server (not illustrated) etc., different from the cooperation source Web server 10. Methods of the user authenticating process by the authenticating process unit 12 are not particularly limited, and well-known techniques such as user authentication through a user ID, a password, etc., may be used properly for the user authenticating process.

The cooperation destination Web server 20 is a server system constituting a Web site (cooperation destination Web site) used by the user using the cooperation source Web site by moving from the cooperation source Web site to the cooperation destination Web site and making both sites cooperating with each other, for example, and a cooperation destination application 21 serving as a Web application by which a service provided by the cooperation destination Web site is realized is operating on the cooperation destination Web server 20. Similarly to the cooperation source Web server 10, the cooperation destination Web server 20 may include an authenticating function (not illustrated) of carrying out the user authenticating process for allowing the user to access the cooperation destination Web site and use its service.

Typically, each of the cooperation source Web site and cooperation destination Web site serves as a shared Web site providing a plurality of users with services as, for example, SaaS (Software as a Service). These Web sites, however, are not limited to the shared Web site.

The present embodiment allows the user accessing the cooperation source Web site through user authentication to automatically log in to the cooperation destination Web site by using a user ID of the cooperation source Web site as an SSO function for accessing the cooperation destination Web site, without requiring mapping between the user ID in the cooperation destination Web site and a user ID in the cooperation source Web site, which is required in the conventional technique. To achieve such SSO, the cooperation destination Web server 20 of the present embodiment includes a guide application 22, a log-in interface 23, and databases such as an application authentication information DB 24 and a redirect information DB 25.

As will be described later, the guide application 22 is a Web application having a function of first displaying a navigate page to which the user is guided automatically when the user tries to access from the cooperation source Web site to the cooperation destination Web site, and then determining whether the user is permitted to use the cooperation destination Web site (that is, whether the user is permitted to log in to the cooperation destination Web site) in response to the user's access to the navigate page.

The log-in interface 23 includes an interface function for receiving a request for logging in from the cooperation source Web site to the cooperation destination Web site through the SSO. For example, the log-in interface 23 is provided as a log-in API (Application Programming Interface), and the cooperation source application 11 can log in to the cooperation destination Web site through the SSO, by calling up this API. The log-in interface 23 carries out authentication for the cooperation source application 11 having called up the log-in API by the application level, and when successfully authenticating the cooperation source application 11, the log-in interface 23 creates redirect information on the target user to send the redirect information as a response, as described later. As a result, access by the user terminal 40 to the cooperation source Web site is redirected to the navigate page of the cooperation destination Web site.

The application authentication information DB 24 is a database storing authentication information used when the log-in interface 23 carries out application authentication for the cooperation source application 11. The authentication information is, for example, registered in advance in the application authentication information DB 24 by an administrator etc. of the cooperation destination Web site, based on a request or the like from each cooperation source Web site to which access is permitted. Contents of the authentication information stored in the application authentication information DB 24 may change depending on a method of application authentication.

A method of the application authentication is not particularly limited and may be designed properly according to a system environment etc. For example, an ID and a password are issued for each cooperation source application 11 and are stored in the application authentication information DB 24, as authentication information, so that application authentication can be carried out by use of such ID and password. Alternatively, a value of an allowable range of an IP address for the cooperation source Web server 10 on which the cooperation source application 11 having called up the log-in API is operating is stored in the application authentication information DB 24, as authentication information, so that application authentication can be carried out by use of a location of the cooperation source Web server 10 or a location network.

The redirect information DB 25 is a database storing redirect information created by the log-in interface 23 for each user of the cooperation source Web site, based on parameters upon calling up the log-in API by the cooperation source application 11, delivered data etc. Based on this redirect information, access from the user terminal 40 to the cooperation source Web site is redirected to the navigate page of the cooperation destination Web site, and contents of the access is checked with contents of the redirect information DB 25 by the guide application 22 to determine the SSO.

<Flow of SSO Process>

FIG. 2, is a schematic diagram of an example of a flow of an SSO process according to the present embodiment of the present invention. Herein, FIG. 2 shows the flow of the process for a case where a user having logged in to the cooperation source application 11 (cooperation source Web site) of the cooperation source Web server 10 through a Web browser (not illustrated) on the user terminal 40 makes a request for accessing the cooperation destination application 21 (cooperation destination Web site) of the cooperation destination Web server 20 and logs in to the cooperation destination application 21 (cooperation destination Web site) through the SSO. It is assumed that authentication information on the cooperation source application 11 has been registered in the application authentication information DB 24 of the cooperation destination Web server 20 in advance.

First, the user instructs the cooperation source application 11 having been accessed from the user terminal 40 to access the cooperation destination Web application 21 (arrow "1" in FIG. 2), Specifically, the user, for example, gives this instruction by clicking a hyperlink to the cooperation destination Web site on a screen displayed through the Web browser of the user terminal 40 by the cooperation source application 11. Receiving the instruction, in order to log in to the cooperation destination Web site through the SSO, the cooperation source application 11 calls up the log-in interface 23 (log-in API) of the cooperation destination Web server 20 and makes a request for redirect information (arrow "2" in FIG. 2).

Based on information such as parameter upon calling up the log-in API and the authentication information registered in the application authentication information DB 24, the log-in interface 23 carries out application authentication for the cooperation source application 11 (arrow "3-1" in FIG. 2). As described above, the application authentication can be carried out by, for example, using an ID and a password that are assigned to each cooperation source application 11. The authentication for the cooperation source application 11 may be carried out every time the user makes a request for logging in through the SSO, carried out only once at the start, of the SSO process, or carried out regularly every time a given time passes. When the application authentication fails, the log-in interface 23 sends an error message.

In contrast, when the application authentication succeeds, the log-in interface 23 stores prescribed information such as a user ID, a user name, and a roll identifying the target user in the redirect information DB 25, as redirect information (arrow "3-2" in FIG. 2). At this time, a redirect token is created and set as key information for identifying the target redirected information among information in the redirect information DB 25. The redirect token is, for example, a character string composed of an identifier (32 characters) such as a UUID (Universally Unique Identifier) or a GUID (Globally Unique Identifier) created for identifying the redirect information data, and a hash value (e.g., 128 characters) that is calculated from the redirect information data by applying a hash function such as an SHA (Secure Hash Algorithm).

Note that an effective period of a given time (a short period of time, e.g., two minutes) is set for the redirect information stored in the redirect information DB 25. For example, when data is stored in the redirect information DB 25, a time stamp indicating the time of storing data is recorded together with the data, so that a piece of data whose effective period has expired is treated as invalid data upon reading data or is checked and deleted regularly. Setting the redirect, information to be effective in a short period of time prevents log-in by a fraudulent SSO which will be described later, so that security can be ensured.

After storing the redirect information in the redirect, information DB 25, the log-in interface 23 sends information of a URL (Uniform Resource Locator) of a location to which access is redirected, to the cooperation, source application 11 (arrow "3-3" in FIG. 2). This URL is a URL for displaying the navigate page provided by the guide application 22 and includes the character string of the redirect token as an argument.

The cooperation source application 11 specifies the acquired URL (and the redirect token) and causes the Web browser of the user terminal 40 to redirect its access to the navigate page provided by the guide application 22 (arrows "4-1" and "4-2" in FIG. 2).

The guide application 22 accessed by the user terminal 40 as a result of the redirection searches the redirect information DB 25, using the redirect token acquired as the argument, as a key, and determines whether the redirect information corresponding to the redirect token is stored in the redirect information DB 25 (arrow "5-1" in FIG. 2). When failing to acquire the redirect information, the guide application 22 determines that the log-in may be made fraudulently, thereby sending an error message to the user terminal 40. As described above, although the redirect information is effective for a short period of time, in the above case of access made by the normal process flow, access to the navigate page can be made within this short effective period without a problem. However, in such a short period of time, it is difficult for a third party to steal created redirect information etc. and make a fraudulent access based on the stolen redirect information, for example.

Meanwhile, when successfully acquiring the redirect information, the guide application 22 creates a log-in cookie related to the cooperation destination Web site, based on the contents of the redirect information such as the user ID, the user name, and the roll, and specifies the cookie to cause the Web browser of the user terminal 40 to redirect its access to the cooperation destination Web site provided by the cooperation destination application 21 (arrows "5-2" and "5-3" in FIG. 2). As a result, the cooperation destination Web site is displayed through the Web browser of the user terminal 40 (arrow "6" in FIG. 2).

Note that, to ensure security against a fraudulent access etc., the cooperation destination application 21 invalidates the log-in cookie when a given time (e.g., 15 minutes) or longer has passed from the time of the previous access, for example. As a result, for example, when a state of no operation on the user terminal 40 continues for 15 minutes or longer, it is possible to make the user terminal 40 execute its log-in process again at the next operation. Also, regardless of whether the user terminal 40 has made access or operation, the log-in cookie is invalidated when a given time (e.g., 12 hours) or longer has passed from the time of its creation. As a result, for example, when 12 hours or longer has passed from the time of the previous log-in, it is possible to make the user terminal 40 execute its log-in process again at the next operation.

As described above, according to the single sign-on system 1 as an embodiment of the present invention, even when the user ID of the target user is not stored and managed in the cooperation destination Web site, if application authentication is carried out between the cooperation source Web site and the cooperation destination Web site, the user is allowed to access the cooperation destination Web site by use of the user ID by which the user has logged in to the cooperation source Web site. In other words, the SSO can be carried out without requiring user ID mapping or association between the cooperation source Web site and the cooperation destination Web site.

In the foregoing, the invention made by the inventor of the present invention has been concretely described based on the embodiment. However, it is needless to say that the present invention is not limited to the foregoing embodiment and various modifications and alterations can be made within the scope of the present invention. For example, the embodiment is described in detail to simplify the description of the present invention. Thus, it is not always necessary to provide all the described configurations. Moreover, a part of the components of the embodiment can be added, omitted, and/or replaced by other components.

INDUSTRIAL APPLICABILITY

The present invention can be applied to a single sign-on system and a single sign-on method that achieves single sign-on in cooperation among a plurality of Web sites.

EXPLANATION OF REFERENCE CHARACTERS

1 . . . single sign-on system, 10 . . . cooperation source Web server, 11 . . . cooperation source application, 12 . . . authenticating process unit, 13 . . . user management DB, 20 . . . cooperation destination Web server, 21 . . . cooperation destination application, 22 . . . guide application, 23 . . . log-in interface, 24 . . . application authentication information DB, 25 . . . redirect information DB, 30 . . . network, 40 . . . user terminal

The invention claimed is:
1. A single sign-on system comprising:
   a first Web server including a first application implemented on a first server device; and a second web server including a second application implemented on a second server device, wherein, in response to a request for accessing the second application from a user having logged in to the first application through a Web browser of an information processing terminal, the system allows the user to log in to the second application by use of a user identification (ID) by which the user has logged in to the first application,
   wherein the second Web server further includes:
      a log-in interface logging in to the second application through single sign-on; and
      a third application receiving access through the Web browser, the access being redirected by the first application to the third application,
   wherein, when receiving the request for accessing the second application from the user, the first application calls up the log-in interface of the second Web server, based on information on the user including the user ID,
   wherein, when called up by the first application, the log-in interface records the information on the user including the user ID, as redirect information, creates a redirect token for identifying the redirect information, and adds the redirect token to a Uniform Resource Locator (URL) for accessing the third application and sends the URL,
   wherein, based on the URL sent in response to the call-up of the log-in interface, the first application redirects the access through the Web browser to the third application, and
   wherein, in response to the redirected access through the Web browser, when the redirect information identified by the redirect token included in the URL is recorded in the second Web server, the third application creates a log-in cookie related to the second application, based on the user ID included in the redirect information, and redirects the access through the Web browser to the second application.

2. The single sign-on system according to claim 1, wherein, in the second Web server, the redirect information recorded by the log-in interface is effective for a given period of time.

3. The single sign-on system according to claim 1, wherein the redirect token created by the log-in interface is composed of identification information assigned to the redirect information, and a hash value calculated based on the redirect information.

4. The single sign-on system according to claim 1, wherein the second application invalidates the log-in cookie when the user makes no access to the second application for a given period of time or longer.

5. The single sign-on system according to claim 1, wherein the second application invalidates the log-in cookie when a given period of time passes after the third application creates the log-in cookie.

6. A single sign-on method in an information processing system comprising:
   logging into a first application located on a first Web server implemented on a first server device, by a user of a Web browser of an information processing terminal;
   requesting access by the user logged into the first application to a second application located on a second Web server implemented on a second server device, by use of a user identification (ID) which the user used to log in to the first application;
      wherein the second Web server further includes:
         a log-in interface logging in to the second application through single sign-on; and
         a third application receiving access through the Web browser, the access being redirected by the first application to the third application;
   calling up the log-in interface of the second Web server by the first application, based on information on the user including the user ID, when the first application receives the request for accessing the second application from the user;
   recording the information on the user including the user ID by the log-in interface, as redirect information, to create a redirect token for identifying the redirect information, and to add the redirect token to a Uniform Resource Locator (URL) for accessing the third application and send the URL when the log-in interface is called up by the first application;

redirecting the access through the Web browser to the third application by the first application, based on the URL sent in response to the calling-up of the log-in interface; and creating by the third application, in response to redirecting the access through the Web browser, a log-in cookie related to the second application, based on the user ID included in the redirect information, and redirecting the access through the Web browser to the second application, when the redirect information identified by the redirect token included in the URL is recorded in the second Web server.

\* \* \* \* \*